Dec. 27, 1927.

B. J. BENGTSSON 1,654,448

STOPPER FOR THE DISCHARGE OPENING OF TRAPS

Filed July 28, 1926

Inventor:
Bror J. Bengtsson.

By William C. Linton.
Attorney.

Patented Dec. 27, 1927.

1,654,448

UNITED STATES PATENT OFFICE.

BROR JOHANNES BENGTSSON, OF KALLERED, SWEDEN, ASSIGNOR TO LUNDBERG & KULLBERG, AKTIEBOLAG, OF GOTHENBURG, SWEDEN, A COMPANY OF SWEDEN.

STOPPER FOR THE DISCHARGE OPENING OF TRAPS.

Application filed July 28, 1926. Serial No. 125,518, and in Sweden July 28, 1925.

The present invention relates to such stoppers or plugs for the discharge opening of traps for slop-sinks and the like which consist of a socket-shaped member provided with a bottom and adapted to be screwed on a threaded portion surrounding the discharge opening, whereby the bottom of the socket is adapted to bear water-tightly against said portion when the socket is entirely screwed on.

It is a considerable inconvenience of such stoppers hitherto known that they must be entirely removed in order to permit the liquid content of the trap to escape. Consequently the liquid in the trap will speedily run down on peril of dashing on adjacent objects.

This invention has for its object to overcome this inconvenience by providing the stopper in such a manner that by loosening it a little only the liquid in the trap will be slowly drawn off, whereupon after that the liquid content has escaped the stopper may be entirely removed in order to make the necessary cleaning of the trap possible.

For this purpose the socket-shaped member is provided with one or more openings or channels the inner orifices of which are disposed outside that portion of the bottom of the socket-shaped member, which is adapted to water-tightly bear against the end of that portion which surrounds the discharge opening.

Figure 1:
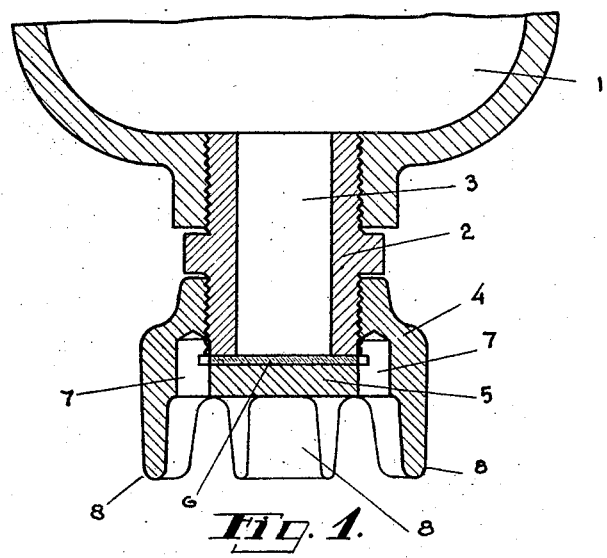
Figure 2:
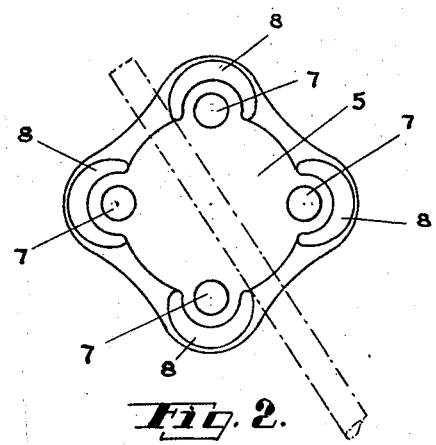

An embodiment of the invention is illustrated in the accompanying drawing, whereby Fig. 1 shows a vertical section through a portion of a trap provided with a stopper according to the invention and Fig. 2 the stopper shown from below.

In the drawing 1 denotes a trap to which a nipple 2 externally provided with screw-threads is fastened. This nipple forms the discharge opening of the trap through which the necessary cleaning of the trap is performed. As a stopper for the discharge opening serves a socket-shaped member 4, interiorly threaded and provided with a bottom 5. This socket is adapted to be screwed on the nipple 2, whereby the bottom portion 5 will water-tightly bear against the lower edge of the nipple 2. In order to prevent leakage, the bottom of the socket 5 may be provided with a packing disc 6 of rubber or some other suitable material.

According to the invention the bottom 5 of the socket is provided with a number of channels or ducts 7 provided with inner orifices which communicate with the interior of the socket. Said orifices are situated outside that portion of the packing disk 6 which co-acts with the lower edge of the nipple 2, so that communication between the discharge opening 3 and the channels 7 is prevented when the socket is entirely screwed on. Suitably the socket 4 is provided with a number of downwardly projecting shields or walls 8, so disposed in relation to the outer orifices of the ducts 7 that liquid escaping through these orifices is prevented from sprinkling to the sides but will be directed downwardly. It may be convenient to give the shields 8 such a form that they can serve as fastenings for some tool when the socket is screwed off or on, whereby the tool, shown in Fig. 2 with dotted lines, is placed in the interspaces between the shields, as shown in said figure. The shields 8 also form a suitable handle when the socket is screwed off or on by hand, whereby the shields prevent the escaping liquid from coming in contact with the hand.

When the socket is to be removed in order to permit the cleaning of the trap, it is at first turned a little so that the packing disc will be removed a little distance from the lower edge of the nipple 2. Thereby the liquid content of the trap is admitted to escape through the channels 7, whereby the liquid will be directed downwardly and easily may be caught in a receptacle placed below the discharge opening without the peril of making adjacent objects dirty. After the liquid content thus has escaped, the socket 4 is entirely removed from the nipple 2 whereby the interior of the trap will be accessible for cleaning.

The invention is not limited to the embodiment shown and described, but details of the same may be changed without departing from the spirit of the invention.

What I claim is:—

1. A stopper comprising in combination a nipple, a socket adjustable thereon and provided with a plurality of channels adapted to be brought into and out of communication with the interior of said nipple upon adjustment of said socket and a plurality of shields depending from the socket in position concentric with said channels.

2. In a device of the character described, a socket provided with a bottom and a plurality of channels passing through the bottom, a packing disk arranged on said bottom in position to allow free passage of fluid through the channels and a plurality of individual shields depending from the socket, each shaped to extend around a channel concentrically thereof.

In witness whereof I have hereunto set my hand.

BROR JOHANNES BENGTSSON.